United States Patent [19]
Nakayama

[11] Patent Number: 5,087,988
[45] Date of Patent: Feb. 11, 1992

[54] ZOOM LENS

[75] Inventor: Hiroki Nakayama, Kanagawa, Japan

[73] Assignee: Canon Kabushiki Kaisha, Tokyo, Japan

[21] Appl. No.: 738,110

[22] Filed: Jul. 30, 1991

[30] Foreign Application Priority Data

Aug. 7, 1990 [JP] Japan .................................. 2-208995

[51] Int. Cl.$^5$ .............................................. G02B 15/15
[52] U.S. Cl. ..................................... 359/689; 359/740
[58] Field of Search ............... 350/423, 427, 450, 474, 350/426

[56] References Cited

U.S. PATENT DOCUMENTS 4,708,444 11/1987 Tsuji ..................................... 350/427

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens of simple structure is disclosed comprising, from front to rear, a first lens unit of positive refractive power, a second lens unit of positive refractive power and a third lens unit of negative refractive refractive power, wherein these three lens units each are constructed from a single block, and zooming from the wide-angle end to the telephoto end is performed by moving the first and third lens units axially toward the object side independent of each other.

11 Claims, 10 Drawing Sheets

FIG.1(A)

IMAGE PLANE

FIG.1(B)

IMAGE PLANE

IMAGE PLANE

IMAGE PLANE

ZOOM LENS

BACKGROUND OF THE INVENTION

1. Field of the Invention:

This invention relates to zoom lenses of simple structure suited to cameras for photography, video cameras, etc. and, more particularly, to zoom lenses of simple structure having three lens units, some of which are moved to effect zooming and which are short in the total lens length and have a good optical performance.

2. Description of the Related Art:

Recently, in the field of lens-shutter cameras and video cameras, minimization of the bulk and size of the camera is advancing. Along this, comes a demand for zoom lenses of smaller size with a shorter total lens length and of simpler form. Of these, the zoom lens whose range includes the standard angle of view (the total angle of view of the field $2\omega = 47°$, or, in terms of the 35 mm still camera, about 50 mm in the focal length) and of relatively small size has been proposed in, for example, Japanese Laid-Open Patent Application No. Sho 60-263113.

In this publication, a first lens group, when counted from the object side, of positive refractive power, a second lens group of positive refractive power and a third lens group of negative refractive power, of which the first and third ones are axially moved both forward in a certain condition to vary the focal length from the wide-angle end to the telephoto end, constitute a so-called 3-unit zoom lens of zoom ratio of about 1.5.

In general, with the use of the above-described three lens groups in constructing the zoom lens, to achieve simplification of the construction and arrangement of the constituent lens elements, it is a good idea to reduce the number of lens elements in each lens group to as few as possible.

To admit maintaining the prescribed zoom ratio and the prescribed minimum angle of view of the field, however, the condition in which the lens groups for varying the focal length move relative to each other and the rules of lens design must be set forth appropriate. Otherwise, the range of variation of aberrations with zooming would be caused to increase largely, which raises difficulties in making good correction of these aberrations.

SUMMARY OF THE INVENTION

The present invention utilizes the refractive power arrangement made in the previous proposal for zoom lenses and further improves the form and the construction and arrangement of the lens elements of each lens group. Especially in the number of lens elements, it aims at a large reduction, while still getting a good optical performance over the entire zooming range. An object of the invention is to provide a zoom lens of simple structure suited to, in particular, lens-shutter cameras.

The zoom lens of simple structure of the invention has, from front to rear, a first lens unit of positive refractive power, a second lens unit of positive refractive power and a third lens unit of negative refractive power, wherein each of these three lens units is constructed from a single block and when zooming from the wide-angle end to the telephoto end, the first lens unit and the third lens unit are moved forward independent of each other.

Particularly in the invention, its characteristic features are that the aforesaid second lens unit is made to move forward in such a manner that, as zooming from the wide-angle end to the telephoto end, the air separation from the first lens unit increases and the air separation to the third lens unit decreases, and that the front lens surface of the single block as the second lens unit is concave toward the front.

BRIEF DESCRIPTION OF THE DRAWINGS

In the lens block diagrams, I, II and III denote the first, second and third lens units respectively, and the arrows indicate the directions of movement of the lens units during zooming from the wide-angle end to the telephoto end.

In the graphs of aberrations, FIGS. 5(A), 6(A), 7(A) and 8(A) are in the wide-angle end, FIGS. 5(B), 6(B), 7(B) and 8(B) in a middle zooming position, and FIGS. 5(C), 6(C), 7(C) and 8(C) in the telephoto end. d stands for the spectral d-line and g for the spectral g-line. S.C. represents the sine condition, $\Delta S$ the sagittal image surface, $\Delta M$ the meridional image surface and Y the image height.

DETAILED DESCRIPTION OF THE PREFERRED EMBODIMENTS

Figure 1A:
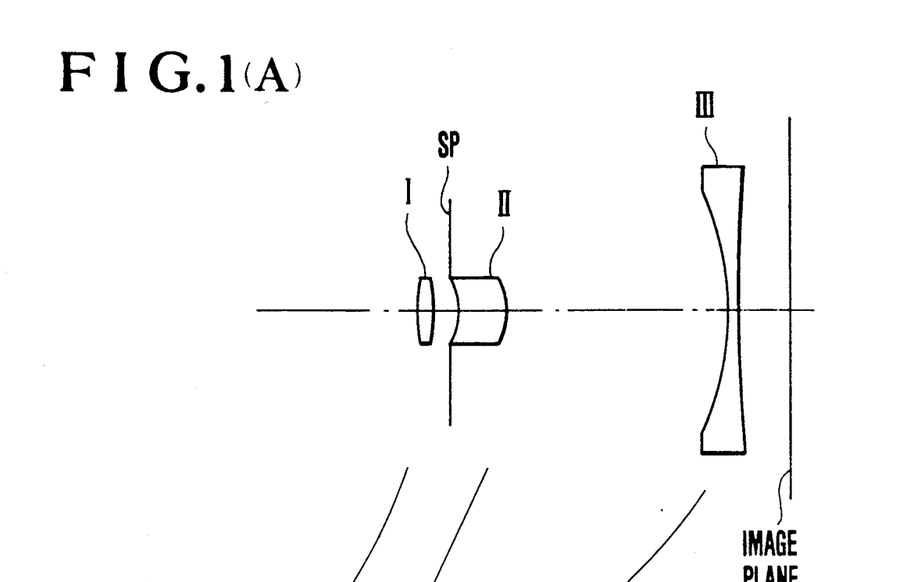
FIGS. 1(A) and 1(B), FIGS. 2(A) and 2(B), FIGS. 3(A) and 3(B), and FIGS. 4(A) and 4(B) are longitudinal section views of examples 1 to 4 of specific zoom lenses of the invention respectively.
Figure 1B:
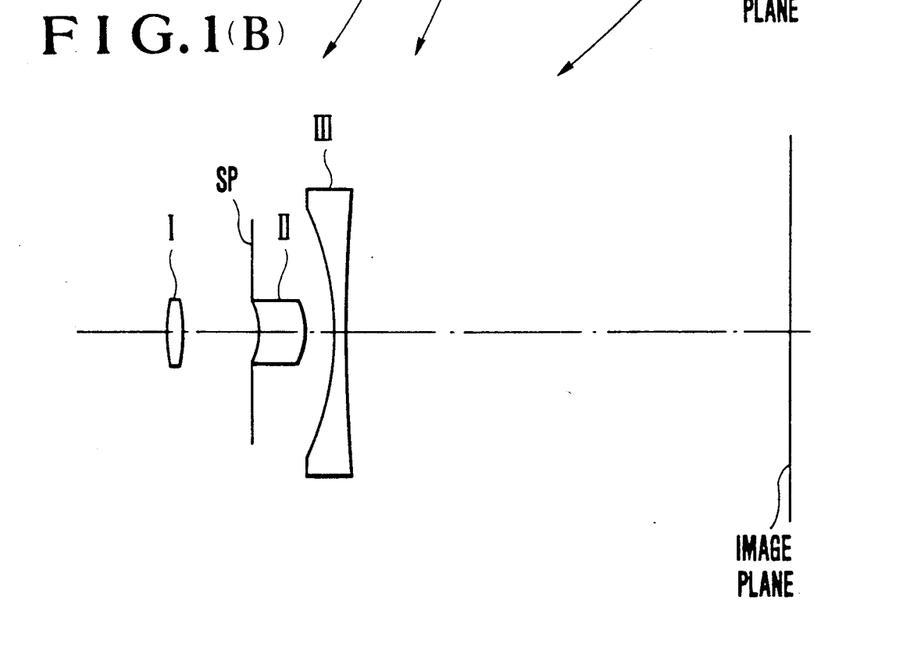
Figure 2A:
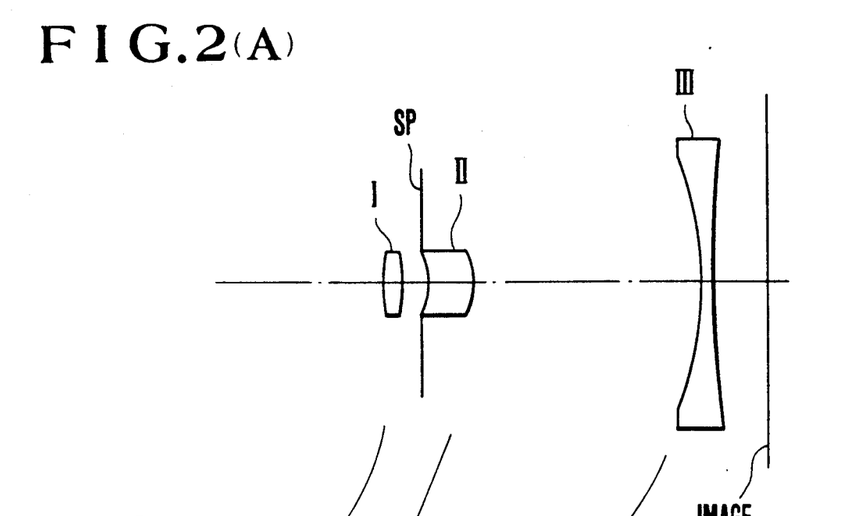
Figure 2B:
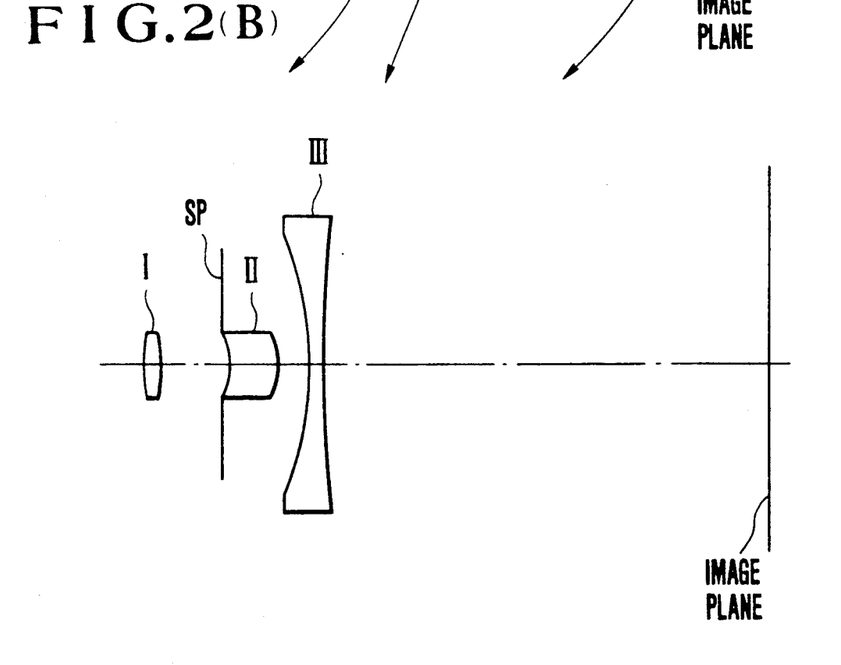
Figure 3A:
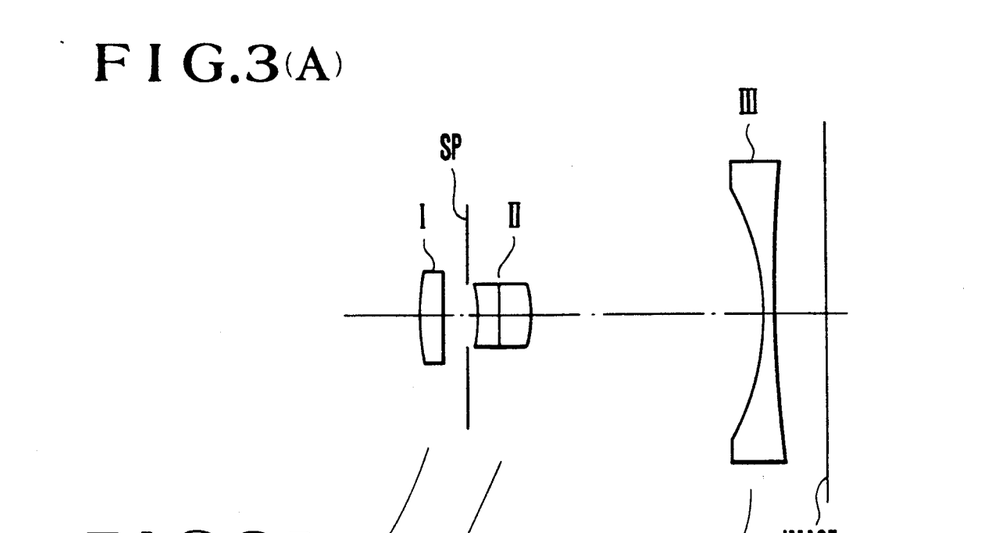
Figure 3B:
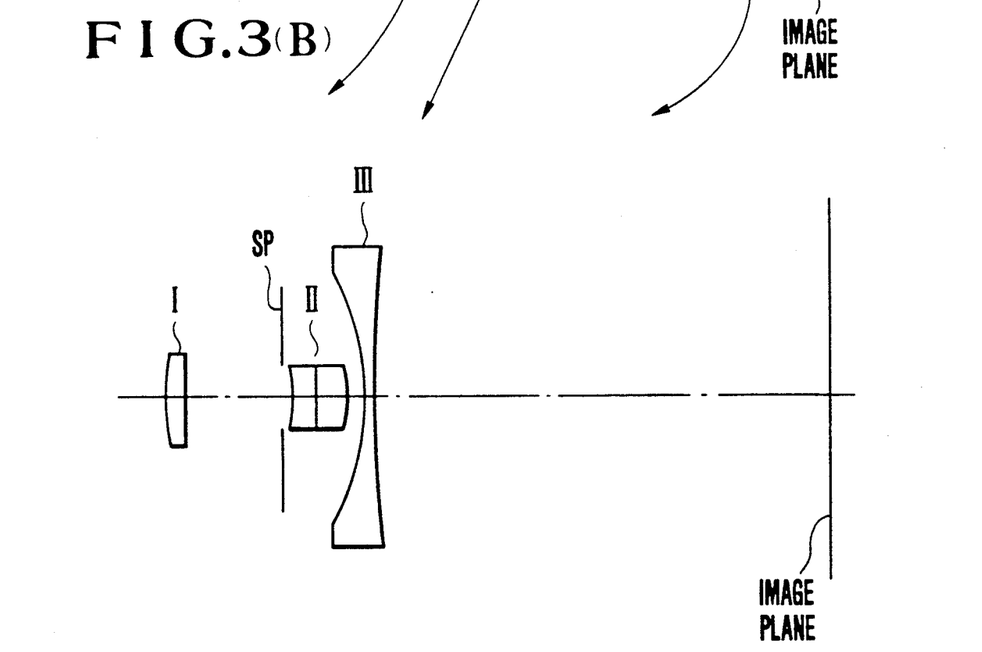
Figure 4A:
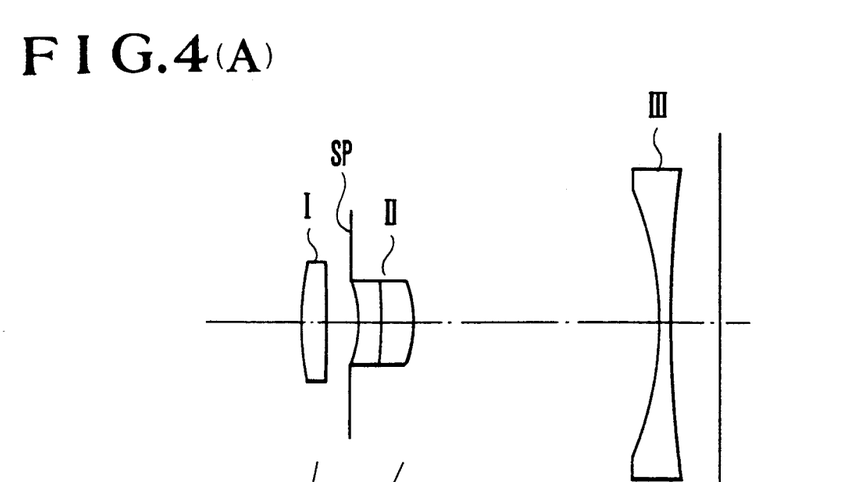
Figure 4B:
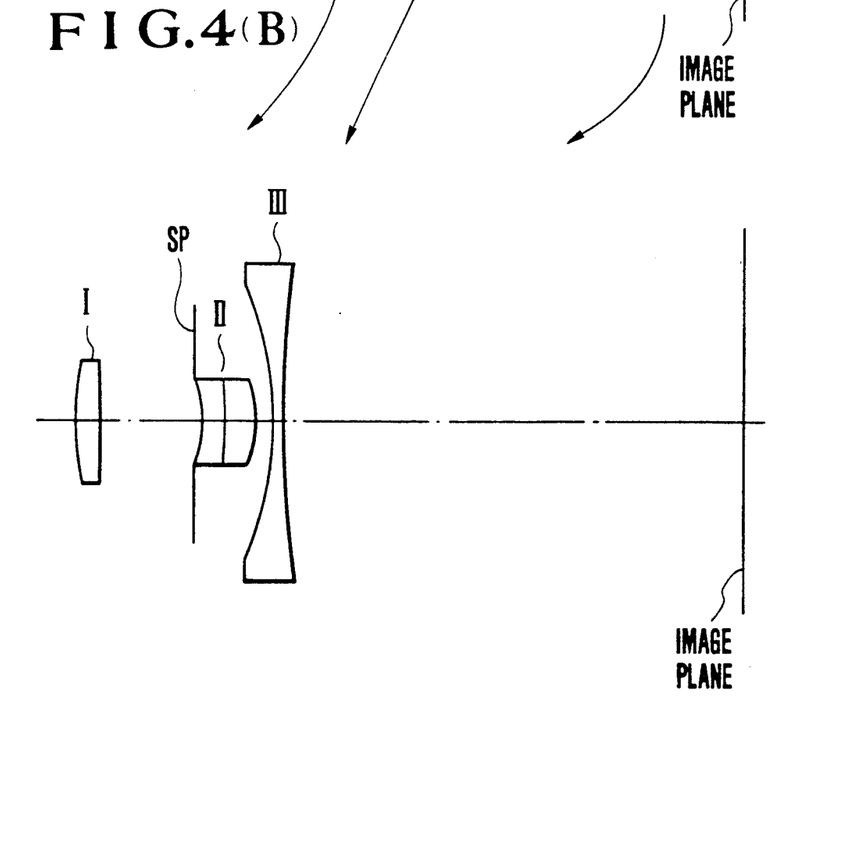

FIGS. 1(A) and 1(B), 2(A) and 2(B), 3(A) and 3(B), and 4(A) and 4(B) show examples 1 to 4 of zoom lenses of the invention. Of these, FIGS. 1(A), 2(A), 3(A) and 4(A) are in a zooming position for the shortest focal length. FIGS. 1(B), 2(B), 3(B) and 4(B) are in another zooming position for the longest focal length.

In the figures, I denotes the first lens unit of positive refractive power, II the second lens unit of positive refractive power and III the third lens unit of negative refractive power. Each of the first, second and third lens units is constructed from a single lens or a single block composed of a plurality of lenses cemented together. The arrows show the directions of movement of the respective lens units as zooming is performed from the wide-angle side to the telephoto side.

According to the invention, in an embodiment thereof, a zoom lens is made so that when zooming from the wide-angle end to the telephoto end, the three lens units are axially moved all toward the object side independent of each other as shown in the figures. It should be explained here that the second lens unit, when zooming from the wide-angle end to the telephoto end, increases its air separation with the first lens unit and decreases its air separation with the third lens unit, thereby reducing the range of variation of aberrations with zooming.

A stop SP is arranged on the object side of the second lens unit to move integrally with the second lens unit during zooming.

The zoom lens of the invention is, as shown in FIGS. 1(A) and 1(B), FIGS. 2(A) and 2(B), FIGS. 3(A) and 3(B) and FIGS. 4(A) and 4(B), constructed from the three lens units of positive, positive and negative refractive powers in this order from the object side. With the use of these three lens units, each other's cancellation of aberrations is produced. In addition, the first lens unit is formed to a positive single lens whose both lens surfaces are convex, the second lens unit to a single lens whose front surface is concave toward the front or to a meniscus-shaped single block composed of a plurality of lenses cemented together, and the third lens unit to a single lens whose both lens surfaces are concave. Accordingly, for a zoom ratio of about 2, the various aberrations including chromatic aberrations are corrected in good balance over the entire zooming range to obtain a high optical performance, while still permitting the shortening of the total lens length to be achieved.

Such features for the zoom lens of simple structure suffice for accomplishing the before-described object of the invention. Further, to obtain a higher optical performance over the entire zooming range, it is recommended to set forth another rules of lens design as follows.

(a) When the third lens unit is constructed from a single lens, letting the refractive index of its material be denoted by N3, $$N3 < 1.7 \ldots \quad (1)$$

is satisfied. In view of the fact that the only one lens unit of negative refractive power in the zoom lens is constructed with the single lens, the inequality of condition (1) gives a specified range for the refractive index of its material and has an aim chiefly to well correct field curvature.

When the condition (1) is violated, the Petzval sum increases in the positive direction with the result that the field curvature increases in the negative direction.

(b) When the first lens unit is constructed from a single lens, letting the Abbe number of its material by $\nu 1$, $$50 < \nu 1 \ldots \quad (2)$$

is satisfied. With respect to the second lens unit carrying the stop, the first lens unit moves in such relation as to be farther away from the second lens unit in the telephoto end than in the wide-angle end. For this reason, violation of the condition (2) results in overcorrection of lateral chromatic aberration. The longitudinal chromatic aberration, too, comes to be undercorrected.

(c) In the point of view of good correction of field curvature and chromatic aberrations, it is preferred that the second lens unit is constructed from a single block composed of a negative lens and a positive lens cemented together in this order from the object side. With this, it is better to form that single block to such a shape that its front surface is concave toward the front and its rear surface is convex toward the rear.

Also, to allow the Petzval sum to take an appropriate value to well correct field curvature, $$N2N < 1.7 \ldots \quad (3)$$

$$1.6 < N2P \ldots \quad (4)$$

are set forth, where N2N and N2P are respectively the refractive indices of the materials of the negative and positive lenses. Further, concerning the refractive indices N2N and N2P, it is preferred to satisfy $$N2N < N2P \ldots \quad (5)$$

because the field curvature can be better corrected.

Also, to well correct variation of chromatic aberrations over the entire zooming range, $$\nu 2N < 50 \ldots \quad (6)$$

$$40 < \nu 2P \ldots \quad (7)$$

are set forth, where $\nu 2N$ and $\nu 2P$ are the Abbe numbers of the materials of the negative and positive lenses respectively. Further, concerning the Abbe numbers $\nu 2N$ and $\nu 2P$, it is preferred to satisfy $$\nu 2N < \nu 2P \ldots \quad (8)$$

because the chromatic aberrations can be better corrected.

(d) Letting the image magnifications of the i-th lens unit in the wide-angle end and the telephoto end be denoted by $\beta iW$ and $\beta iT$ respectively, putting $Zi = \beta iT/\beta iW$, and letting the amount of movement of the i-th lens unit as zooming from the wide-angle end to the telephoto end be denoted by $\Delta i$ and the difference between focal lengths in the wide-angle end and the telephoto end of the entire lens system by $\Delta f$, it is preferred to set forth $$Z2 < Z3 \ldots \quad (9)$$

$$0.4 < |\Delta 2/\Delta f| < 1.0 \ldots \quad (10)$$

$$1.1 < |\Delta 3/\Delta f| < 1.7 \ldots \quad (11)$$

$$1.1 < \Delta 1/\Delta 2 < 1.8 \ldots \quad (12)$$

in order to obtain a good optical performance over the entire zooming range while still permitting the prescribed zoom ratio to be realized in practice with ease.

The conditions (9), (10) and (11) correlate with one another. To obtain a desired zoom ratio with high efficiency, it is better to make the zoom ratio for the third lens unit larger than for the second lens unit. In the present embodiment, owing to the lens configuration, violation of the range of the condition (9) leads to a necessity of increasing the total zooming movement of the second lens unit. Since the stop is associated with the second lens unit, such increase of the movement of the second lens unit causes the chromatic aberrations to vary to a larger extent with zooming and also causes the F-number for the telephoto side to increase. Thus, the lens system becomes slower. This should be avoided.

The conditions (10) and (11) concretely show the feature on the condition (9). When the conditions (10) and (11) are violated, particularly when both of the lower limits are exceeded there arises a necessity of strengthening the refractive power of each lens unit in order to obtain the desired zoom ratio. This results in an increase in the inclination of the field curvature with zooming. When the upper limits are exceeded, the size of the entire lens system comes to increase. Particularly when the upper limit of the condition (10) is exceeded, the variation with zooming of chromatic aberrations and the variation of the F-number come to increase.

When the upper limit of the condition (12) is exceeded, the size of the entire lens system increases. When the lower limit is exceeded, it becomes difficult to obtain the desired zoom ratio efficiently.

(e) It is preferred to form at least one lens surface of the second lens unit to an aspheric shape such that the positive refractive power gets progressively weaker, or the negative refractive power gets progressively stronger, toward the margin.

It is to be noted that in the present embodiment, to do focusing, either one of the first and third lens units may be axially moved along an optical axis. Alternatively, the first and second lens units may be moved integrally along the optical axis. Instead, the lens system may be axially moved as a whole.

Numerical examples 1 to 4 of the invention are shown below. In the numerical data of the examples 1 to 4, Ri is the radius of curvature of the i-th lens surface, when counted from the front, Di the i-th lens thickness or air separation, and Ni and $\nu i$ are the refractive index and Abbe number of the glass of the i-th lens element respectively.

The relationship between the above-described conditions (9) to (12) and the numerical examples 1 to 4 is shown in Table-1.

The shape of the aspheric surface is expressed in the coordinate with an X-axis in the axial direction and an H-axis in the perpendicular direction to the optical axis, the direction in which light advances being taken as positive, by the following equation:

$$X = (1/R)H^2/(1+(1-(H/R)^2)^{\frac{1}{2}}) + a_1 H^2 + a_2 H^4 + a_3 H^6 + a_4 H^8 + a_5 H^{10}$$

where R is the radius of the osculating sphere and $a_1, a_2, \ldots, a_5$ are the aspheric coefficients.

Notation of, for example, D-0x means $10^{-x}$.

Figure 5A:
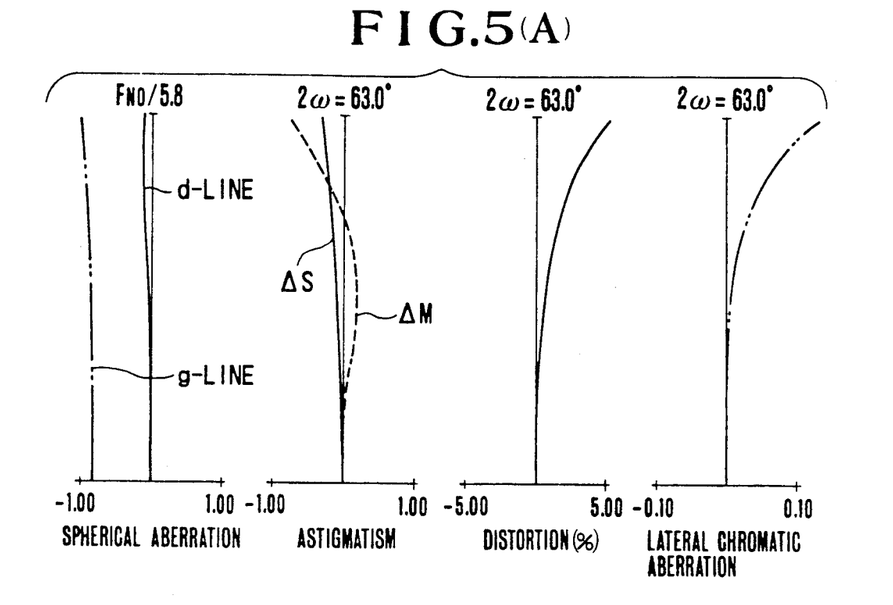
FIGS. 5(A), 5(B) and 5(C), FIGS. 6(A), 6(B) and 6(C), FIGS. 7(A), 7(B) and 7(C) and FIGS. 8(A), 8(B) and 8(C) are graphic representations of the aberrations of the specific examples 1 to 4 of the invention respectively.
Figure 5B:
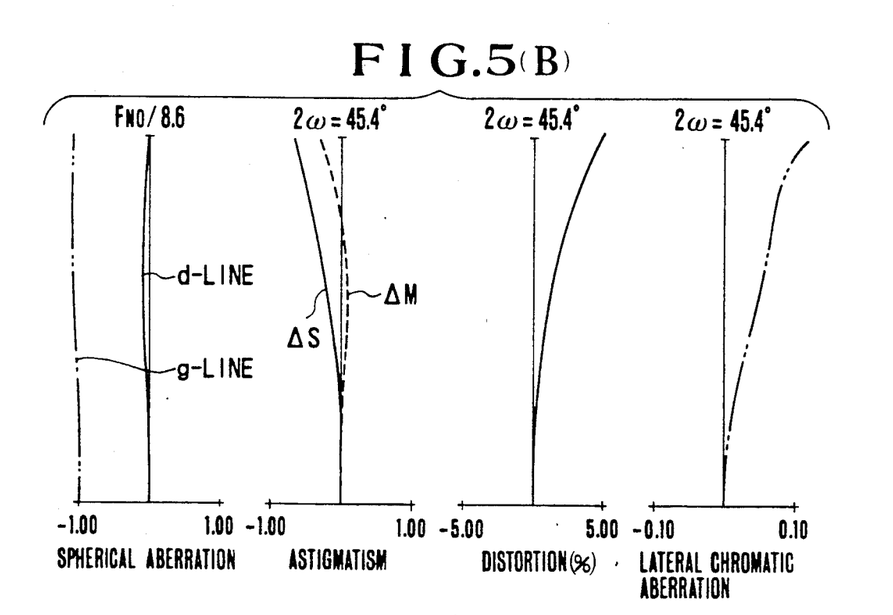
Figure 5C:
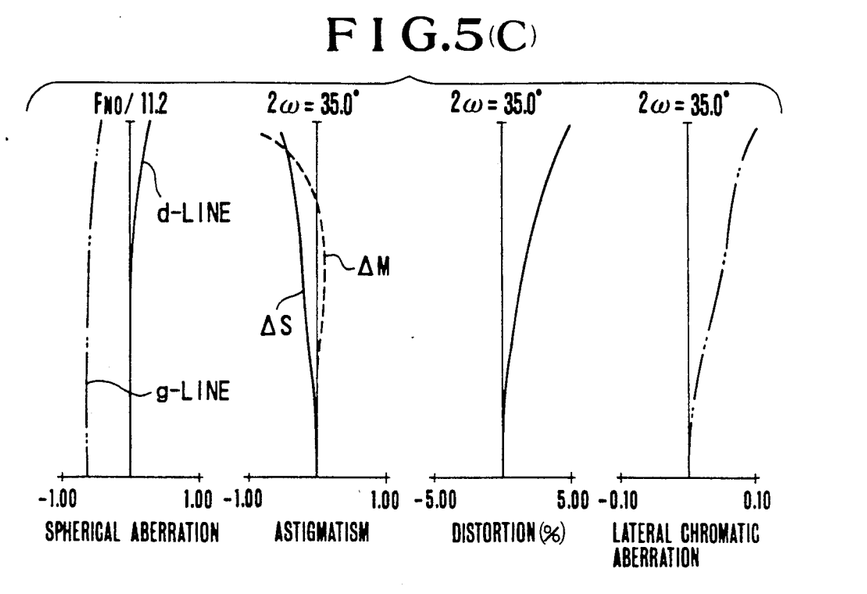

Numerical Example 1: (FIGS. 1(A), 1(B), 5(A), 5(B) and 5(C))

F = 35.0–68.0   FNo = 1:5.8–11.2   $2\omega = 63°-35°$

| R 1 = 24.20 | D 1 = 1.59 | N 1 = 1.49700 | $\nu$ 1 = 81.6 |
|---|---|---|---|
| R 2 = −111.93 | D 2 = Variable | | |
| R 3 = Stop | D 3 = 0.83 | | |
| R 4 = −9.28 | D 4 = 5.17 | N 2 = 1.53172 | $\nu$ 2 = 48.9 |
| R 5 = −8.96 | D 5 = Variable | | |
| R 6 = −36.05 | D 6 = 1.10 | N 3 = 1.63636 | $\nu$ 3 = 35.4 |
| R 7 = 189.92 | | | |

Lens Separations during Zooming

| Focal Length | 35.00 | 51.66 | 67.96 |
|---|---|---|---|
| D 2 | 1.09 | 2.30 | 7.08 |
| D 5 | 25.72 | 11.89 | 3.14 |

5th Surface: Aspherical

| $a_1$ = 0.00 | $a_2$ = 8.959D-05 |
|---|---|
| $a_3$ = 1.170D-06 | $a_4$ = 5.415D-22 |
| $a_5$ = 9.366D-29 | |

Figure 6A:
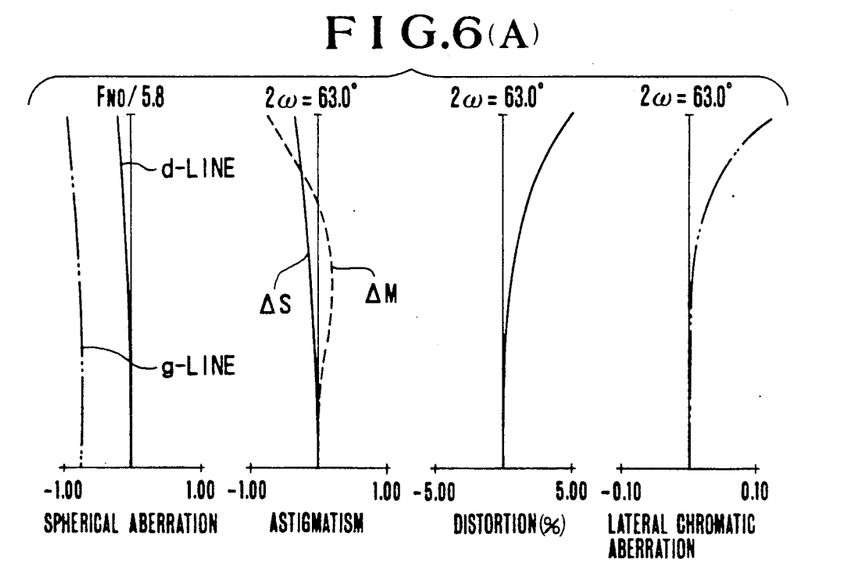
Figure 6B:
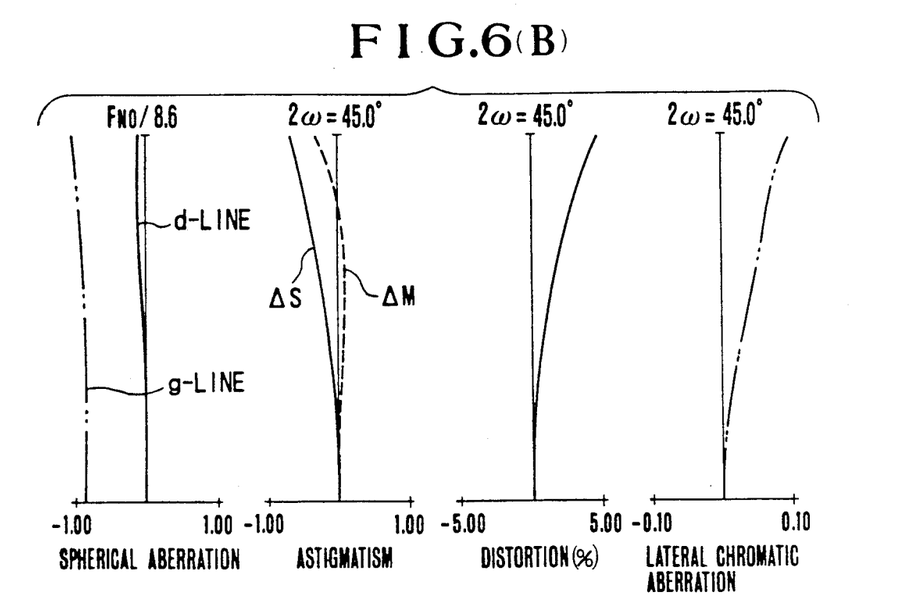
Figure 6C:
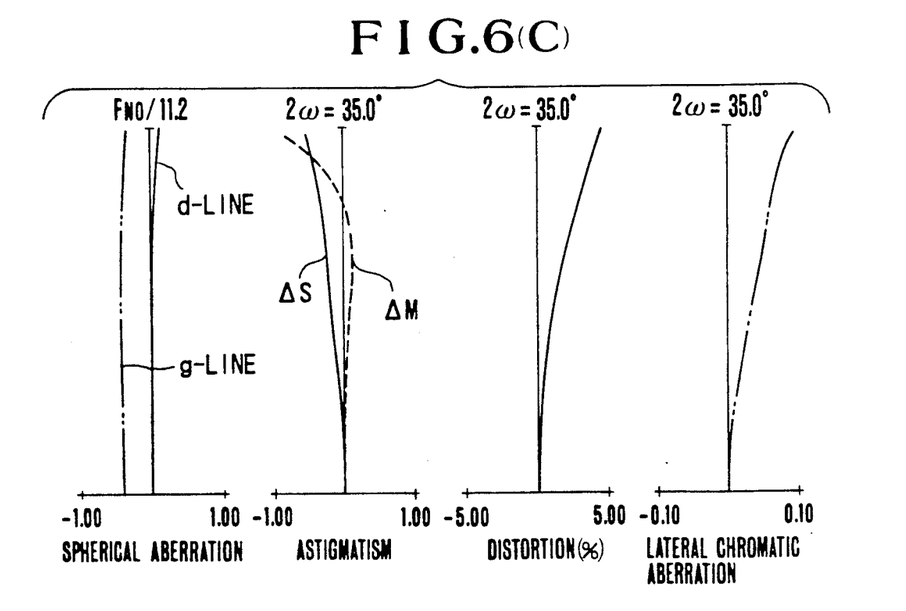
Figure 7A:
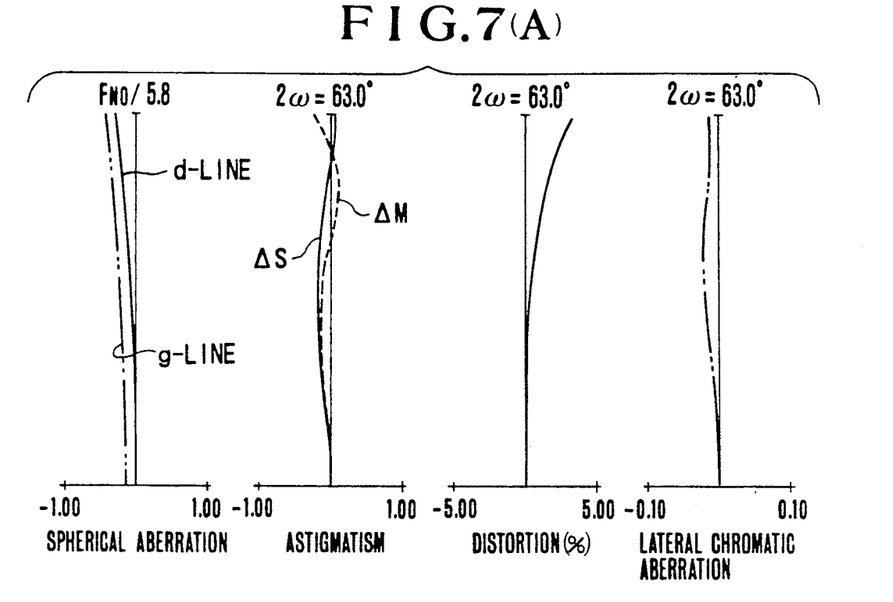
Figure 7B:
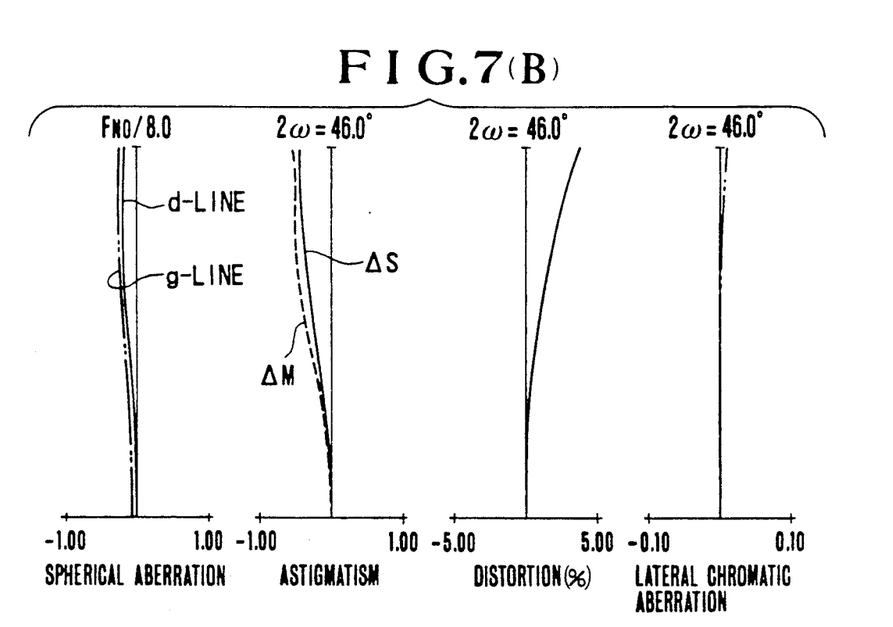
Figure 7C:
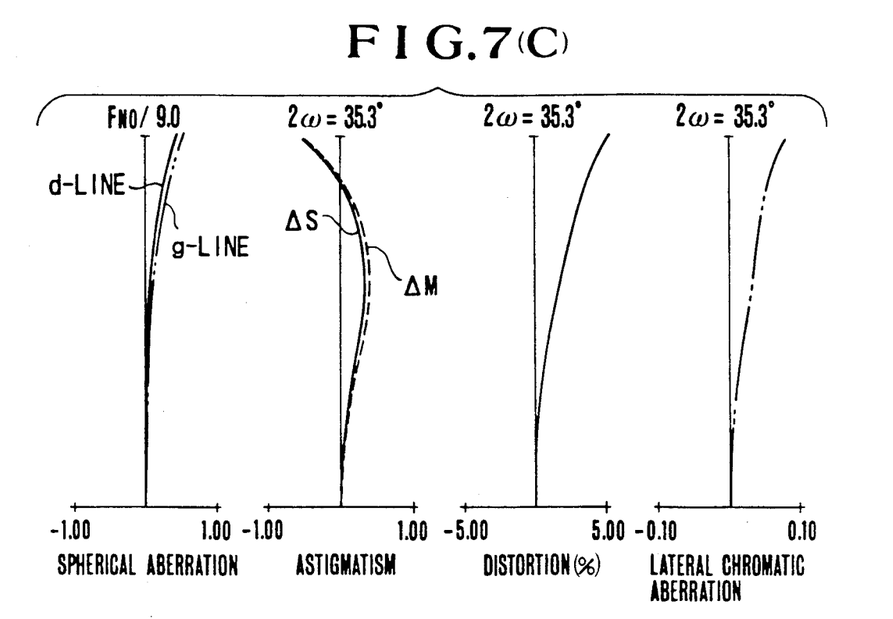

Numerical Example 2: (FIGS. 2(A), 2(B), 6(A), 6(B) and 6(C))

F = 35.1–67.97   FNo = 1:5.8–11.2   $2\omega = 63°-35°$

| R 1 = 21.27 | D 1 = 1.52 | N 1 = 1.43875 | $\nu$ 1 = 95.0 |
|---|---|---|---|
| R 2 = −96.37 | D 2 = Variable | | |
| R 3 = Stop | D 3 = 0.88 | | |
| R 4 = −9.23 | D 4 = 5.20 | N 2 = 1.53172 | $\nu$ 2 = 48.9 |
| R 5 = −8.96 | D 5 = Variable | | |
| R 6 = −35.48 | D 6 = 1.10 | N 3 = 1.63636 | $\nu$ 3 = 35.4 |
| R 7 = 187.27 | | | |

Lens Separations during Zooming

| Focal Length | 35.18 | 51.91 | 67.97 |
|---|---|---|---|
| D 2 | 1.08 | 2.22 | 6.68 |
| D 5 | 25.86 | 12.26 | 3.78 |

5th Surface: Aspherical

| $a_1$ = 0.00 | $a_2$ = 9.001D-05 |
|---|---|

-continued

Numerical Example 2: (FIGS. 2(A), 2(B), 6(A), 6(B) and 6(C))

| $a_3$ = 9.613D-07 | $a_4$ = 5.415D-22 |
|---|---|
| $a_5$ = 9.366D-29 | |

F = 35.4–68.0   FNo = 1:5.8–9.0   $2\omega = 63°-35.3°$

| R 1 = 27.46 | D 1 = 2.72 | N 1 = 1.49700 | $\nu$ 1 = 81.6 |
|---|---|---|---|
| R 2 = −162.71 | D 2 = Variable | | |
| R 3 = Stop | D 3 = 1.10 | | |
| R 4 = −11.27 | D 4 = 2.46 | N 2 = 1.64769 | $\nu$ 2 = 33.8 |
| R 5 = −136.16 | D 5 = 3.64 | N 3 = 1.71999 | $\nu$ 3 = 50.3 |
| R 6 = −11.65 | D 6 = Variable | | |
| R 7 = −30.69 | D 7 = 1.10 | N 4 = 1.49700 | $\nu$ 4 = 81.6 |
| R 8 = 236.86 | | | |

Lens Separations during Zooming

| Focal Length | 35.41 | 50.69 | 68.02 |
|---|---|---|---|
| D 2 | 1.15 | 2.69 | 9.77 |
| D 6 | 26.71 | 11.92 | 1.82 |

6th Surface: Aspherical

| $a_1$ = 0.00 | $a_2$ = 4.059D-05 |
|---|---|
| $a_3$ = 4.255D-0 | $a_4$ = 6.901D-18 |
| $a_5$ = 1.478D-28 | |

Figure 8A:
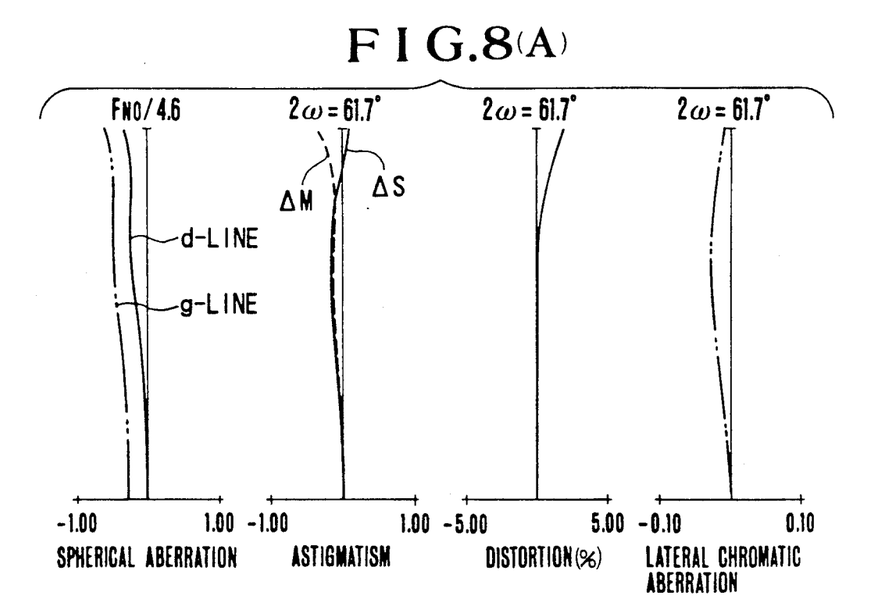
Figure 8B:
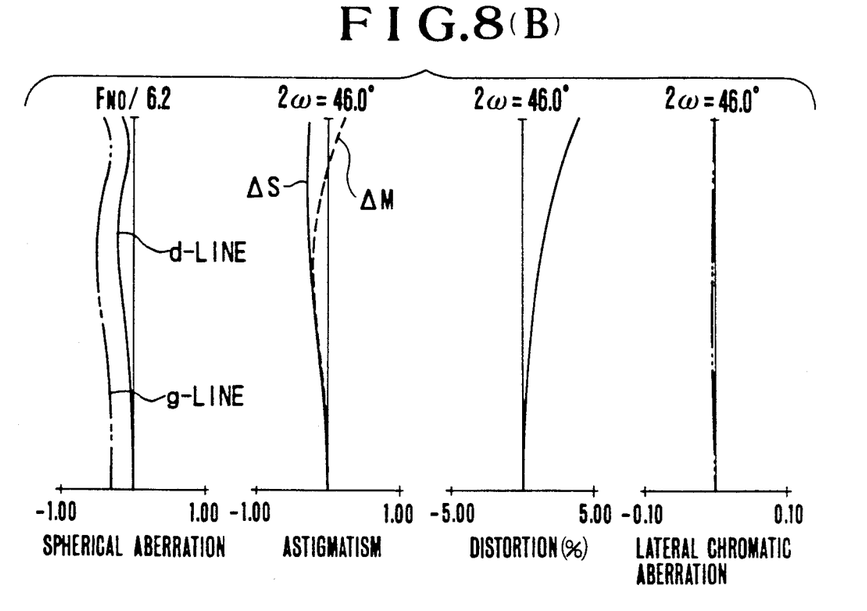
Figure 8C:
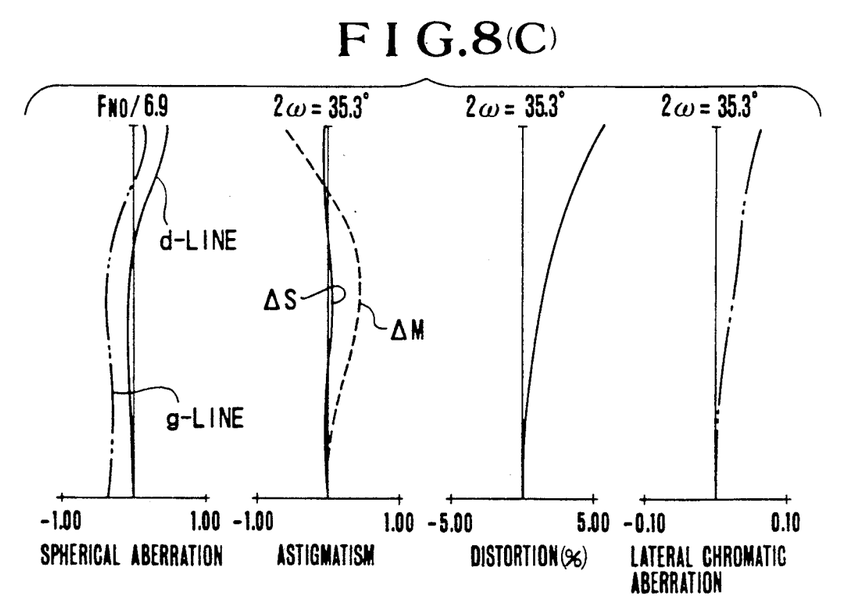

Numerical Example 4: (FIGS. 4(A), 4(B), 8(A), 8(B) and 8(C))

F = 36.22–68.0   FNo = 1:4.6–6.9   $2\omega = 61.7°-35.3°$

| R 1 = 29.35 | D 1 = 3.06 | N 1 = 1.49700 | $\nu$ 1 = 81.6 |
|---|---|---|---|
| R 2 = −124.48 | D 2 = Variable | | |
| R 3 = Stop | D 3 = 1.13 | | |
| R 4 = −10.94 | D 4 = 2.32 | N 2 = 1.64769 | $\nu$ 2 = 33.8 |
| R 5 = −42.26 | D 5 = 3.65 | N 3 = 1.71999 | $\nu$ 3 = 50.3 |
| R 6 = −11.38 | D 6 = Variable | | |
| R 7 = −40.44 | D 7 = 1.10 | N 4 = 1.49700 | $\nu$ 4 = 81.6 |
| R 8 = −110.39 | | | |

Lens Separations during Zooming

| Focal Length | 36.23 | 50.72 | 67.97 |
|---|---|---|---|
| D 2 | 1.05 | 2.45 | 10.11 |
| D 6 | 27.95 | 12.58 | 1.39 |

6th Surface: Aspherical

| $a_1$ = 0.00 | $a_2$ = 4.327D-05 |
|---|---|
| $a_3$ = −2.724D-07 | $a_4$ = 6.725D-08 |
| $a_5$ = −1.892D-09 | |

TABLE 1

| Condition | Numerical Example | | | |
|---|---|---|---|---|
| | 1 | 2 | 3 | 4 |
| (9) Z2/Z3 | 0.59 | 0.58 | 0.64 | 0.65 |
| (10) $|\Delta 2/\Delta f|$ | 0.66 | 0.66 | 0.62 | 0.61 |
| (11) $|\Delta 3/\Delta f|$ | 1.35 | 1.33 | 1.39 | 1.44 |
| (12) $\Delta 1/\Delta 2$ | 1.28 | 1.26 | 1.42 | 1.47 |

According to the present invention, as has been described above, by specifying the refractive powers, the form and the construction and arrangement of the three lens units, a minimization of the size of the entire system is achieved and, as the zoom ratio is about 2, a good optical performance is maintained over the entire zooming range, when a zoom lens of simple structure is realized.

What is claimed is:

1. A zoom lens comprising, from an object side, a first lens unit of positive refractive power, a second lens unit of positive refractive power and a third lens unit of negative refractive power, wherein each of said first, second and third lens units is constructed from a single block, and zooming from a wide-angle end to a telephoto end is performed by moving said first and third lens units axially toward the object side independent of each other.

2. A zoom lens according to claim 1, wherein said second lens unit is moved axially toward the object side in such a manner as to increase its air separation from said first lens unit and to decrease its air separation to said third lens unit when zooming from the wide-angle end to the telephoto end.

3. A zoom lens according to claim 2, wherein an object-side lens surface of the single block serving as said second lens unit is concave toward the object side.

4. A zoom lens according to claim 1, wherein each of said first, second and third lens units is a single lens.

5. A zoom lens according to claim 4, satisfying the following condition:

$$N3 < 1.7$$

where N3 is the refractive index of said third lens unit.

6. A zoom lens according to claim 4, satisfying the following condition:

$$50 < \nu 1$$

where $\nu 1$ is the Abbe number of said first lens unit.

7. A zoom lens according to claim 1, wherein said second lens unit is composed of a negative lens and a positive lens cemented together, satisfying the following conditions:

$$N2N < 7$$

$$1.6 < N2P$$

where N2N and N2P are the refractive indices of said negative and positive lenses respectively.

8. A zoom lens according to claim 7, satisfying the following condition:

$$N2N < N2P$$

9. A zoom lens according to claim 8, satisfying the following conditions:

$$\nu 2N < 50$$

$$40 < 2P$$

where $\nu 2N$ and $\nu 2P$ are the Abbe numbers of said negative and positive lenses respectively.

10. A zoom lens according to claim 9, satisfying the following condition:

$$\nu 2N < \nu 2P$$

11. A zoom lens according to claim 1, wherein letting image magnifications of the i-th lens unit, when counted from the object side, in the wide-angle end and the telephoto end be denoted by $\beta iW$ and $\beta iT$ respectively, putting $Zi = \beta it/\beta iW$, and letting an amount of movement of the i-th lens unit as zooming from the wide-angle end to the telephoto end be denoted by $\Delta i$ and a difference between focal lengths in the wide-angle and the telephoto end of the entire lens system of $\Delta f$, the following conditions are satisfied:

$$Z2 < Z3$$

$$0.4 < \{\Delta 2/\Delta f\} < 1.0$$

$$1.1 < \{\Delta 3/\Delta f\} < 1.7$$

$$1.1 < \Delta 1/\Delta 2 < 1.8$$

* * * * *

UNITED STATES PATENT AND TRADEMARK OFFICE
CERTIFICATE OF CORRECTION

PATENT NO. : 5,087,988   Page 1 of 2
DATED : February 11, 1992
INVENTOR(S) : HIROKI NAKAYAMA It is certified that error appears in the above-identified patent and that said Letters Patent is hereby corrected as shown below:

IN THE ABSTRACT:

[57] Line 4, "refractive refractive" should read --refractive--.

Column 1:

Line 15, "Along" should read --Along with--.

Line 38, "To admit maintaining" should read --To maintain--.

Line 43, "ate." should read --ateley.--

Column 3:

Line 18, "another" should read --other--.

Line 36, "by" should read --be--.

Column 4:

Line 29, "$0.4 < |\Delta 2/\Delta f\} < 1.0 \ldots (10)$" should read --$0.4 < 1 |\Delta 2/\Delta f| < 1.0 \ldots (10)$--.

Line 31, "$1.1 < |\Delta 3/\Delta f\} < 1.7 \ldots (11)$" should read --$1.1 < |\Delta 3/\Delta f| < 1.7 \ldots (11)$--.

Column 5:

Line 26, "X-" should read -- X= --.

UNITED STATES PATENT AND TRADEMARK OFFICE
CERTIFICATE OF CORRECTION

PATENT NO. : 5,087,988

DATED : February 11, 1992

INVENTOR(S) : HIROKI NAKAYAMA

It is certified that error appears in the above-identified patent and that said Letters Patent is hereby corrected as shown below:

Column 8:

Line 12, "$40 < 2P$" should read --$40 < \upsilon 2P$--.

Line 33, "$0.4 < \{\Delta 2/\Delta f\} < 1.0$" should read --$0.4 < |\Delta 2/\Delta f| < 1.0$--.

Line 35, "$1.1 < \{\Delta 3/\Delta f\} < 1.7$" should read --$1.1 < |\Delta 3/\Delta f| < 1.7$--.

Signed and Sealed this

Twenty-first Day of September, 1993

Attest:

BRUCE LEHMAN

*Attesting Officer*  *Commissioner of Patents and Trademarks*